United States Patent
Berels et al.

(10) Patent No.: US 6,630,813 B2
(45) Date of Patent: Oct. 7, 2003

(54) METHOD AND APPARATUS FOR MONITORING THE STATE OF THE BATTERY OF A HYBRID ELECTRIC VEHICLE

(75) Inventors: David Jeffeory Berels, Plymouth, MI (US); Theodore James Miller, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,950

(22) Filed: Mar. 6, 2002

(65) Prior Publication Data
US 2003/0169018 A1 Sep. 11, 2003

(51) Int. Cl.$^7$ .................................................. H02J 7/00
(52) U.S. Cl. ...................................... 320/132; 320/134
(58) Field of Search ................................. 320/132, 134, 320/136, 152, 104; 340/636; 324/427, 431, 426

(56) References Cited

U.S. PATENT DOCUMENTS

| | | | | |
|---|---|---|---|---|
| 4,937,528 A | * | 6/1990 | Palanisamy | 324/430 |
| 5,130,659 A | | 7/1992 | Sloan | 324/435 |
| 6,039,390 A | * | 3/2000 | Agrawal et al. | 296/211 |
| 6,300,763 B1 | * | 10/2001 | Kwok | 324/427 |
| 6,369,578 B1 | * | 4/2002 | Crouch, Jr. et al. | 324/426 |
| 6,404,163 B1 | * | 6/2002 | Kapsokavathis et al. | 320/104 |
| 6,429,812 B1 | * | 8/2002 | Hoffberg | 342/357 |

* cited by examiner

*Primary Examiner*—Lawrence Luk
(74) *Attorney, Agent, or Firm*—Artz & Artz; Carlos Hanze

(57) ABSTRACT

A system (40) for an automotive vehicle has a temperature sensor (90) generating a temperature signal indicative of the temperature outside the vehicle and a battery. A battery controller (54) is coupled to the temperature sensor (90) and the battery (64). The controller monitors a state of charge of the battery (64), monitors a temperature outside of the vehicle and compares the state of charge to a predetermined state of charge. The predetermined state of charge is a function of the temperature. The controller (54) generates an indicator when the state of charge reaches the predetermined state of charge.

21 Claims, 3 Drawing Sheets

METHOD AND APPARATUS FOR MONITORING THE STATE OF THE BATTERY OF A HYBRID ELECTRIC VEHICLE

BACKGROUND OF INVENTION

The present invention relates generally to hybrid electric automotive vehicles, and more specifically, to monitoring the state of charge of the batteries of the hybrid electric vehicle.

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/generator functions as a starter. While functioning as a starter, the starter/generator rotates the crankshaft of the engine while the cylinders are fired.

After the engine is started, the starter/generator is used as a generator to charge the electrical system of the vehicle.

In foreseeable automotive applications, the engine may be shut down during stops (e.g., red lights). When the accelerator is depressed, the starter/generator starts the motor and the engine will resume firing. Thus, many startups may occur over the course of a trip.

Electrical energy from the 42 volt battery of the vehicle is used to turn the starter/generator which in turn is used to start the motor. Consequently, it is important to maintain the battery so that a certain state of charge is provided to allow the battery to provide enough power to the starter/generator to start the engine. Known systems include ammeters to show the charging of the battery but do not provide an indication as to the capacity of the battery to energize a starting component such as the starter/generator. Also, other factors such as the outside temperature of the vehicle are also not considered in such determinations.

It would therefore be desirable to provide a battery charge monitor to provide an indication to the vehicle operator that the battery may not have sufficient charge or capacity to power the starter/generator to start the engine.

SUMMARY OF INVENTION

The present invention provides a way in which to notify vehicle operators as to the state of the battery. The notification is preferably provided early enough to allow changes to be made so that the vehicle will have enough power to start.

In one aspect of the invention, a method of indicating for a battery of an automotive vehicle comprising monitoring a state of charge of the battery, monitoring a temperature outside of the vehicle, comparing the state of charge to a predetermined state of charge, the predetermined state of charge being a function of the temperature, and generating an indicator when the state of charge reached the predetermined state of charge.

In a further aspect of the invention, a system for an automotive vehicle has a temperature sensor generating a temperature signal indicative of the temperature outside the vehicle and a battery. A battery controller is coupled to the temperature sensor and the battery. The controller monitors a state of charge of the battery and compares the state of charge to a predetermined state of charge. The predetermined state of charge is a function of the temperature. The controller generates an indicator when the state of charge reaches the predetermined state of charge.

One advantage is that the indicator may be provided to the operator in time so that an evasive action may be performed to prevent the state of charge or the battery health to degrade to a point where the battery cannot provide enough power to start the vehicle.

Other advantages and features of the present invention will become apparent when viewed in light of the detailed description of the preferred embodiment when taken in conjunction with the attached drawings and appended claims.

DETAILED DESCRIPTION

The present invention is described with respect to a particular configuration of a starter/generator relative to a hybrid electric vehicle. However, the teachings of the present invention may be applied to various type of vehicles have battery powered electrical systems.

Figure 1:
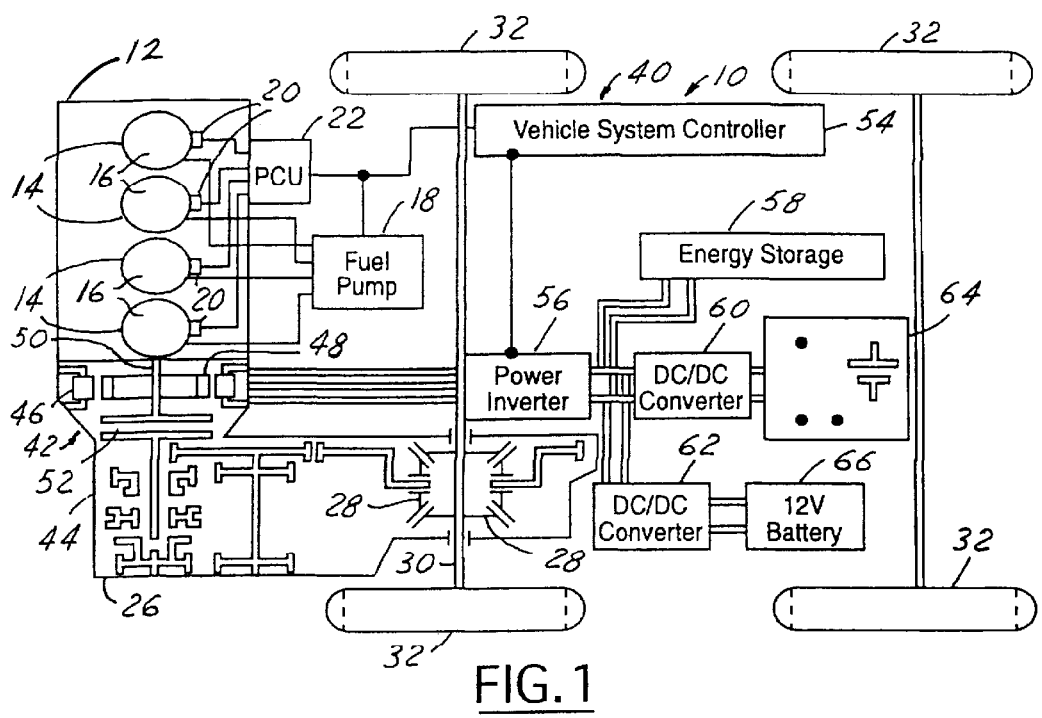
FIG. 1 is a schematic view of an automotive vehicle having a starter/generator system according to the present invention.

Referring now to FIG. 1, an automotive vehicle 10 is illustrated having an internal combustion engine 12 having cylinders 14 with pistons 16 located therein. Each cylinder 14 is coupled to a fuel pump 18 through a fuel injector (not shown) or other fuel delivery system. Each cylinder 14 also has a spark plug 20 or other ignition source coupled to a powertrain control unit. A powertrain control unit 22 controls the ignition timing and fuel pump operation 18 in a conventional manner subject to the improvements of the present invention.

Engine 12 is coupled to a transmission 26. Transmission 26 may be automatic, manual or continuously variable. Transmission 26 is coupled to a differential 28 to drive an axle 30 to provide power to wheels 32. Of course, the present invention is also applicable to four wheel drive systems in which all of the wheels 32 are driven. A starter/generator system 40 that includes a starter/generator 42 and its associated control electronics is coupled to engine 12. In the present invention, starter/generator 42 is positioned between a housing 44 of transmission 26 and the engine 12. Of course, those skilled in the art will recognize other positions are available including but not limited to belt driven types. Starter/generator 42 has a stator fixedly attached to bell housing 44 and a rotor 48 coupled to a crankshaft 50 of engine 12. A clutch 52 is used to engage and disengage engine 12 from transmission 26. As will be further described below, starter/generator 42 is used as a starter during engine startup and as an alternator to supply power to recharge the batteries of the vehicle and to supply electrical loads. Clutch 52 allows starter/generator 42 to start the engine prior to engagement of the transmission.

Starter/generator system 40 has a system controller 54 that is coupled to powertrain control unit 22 and to a power inverter 56. In practice, the power inverter 56 and system controller 54 may be contained in a single package. The inverter 56 is used to convert DC power to AC power in the motoring mode and AC power to DC power in power generation mode as will be further described below.

Power inverter 56 is coupled to an energy storage device 58 such as an ultra capacitor, a first DC to DC converter 60, and a second DC to DC converter 62. DC to DC converter 60 is coupled to a 42 volt battery 64. DC to DC converter 62 is coupled to a 12 volt battery 66. Of course, the actual battery voltage is dependent on the particular system to which it is attached.

Figure 2:
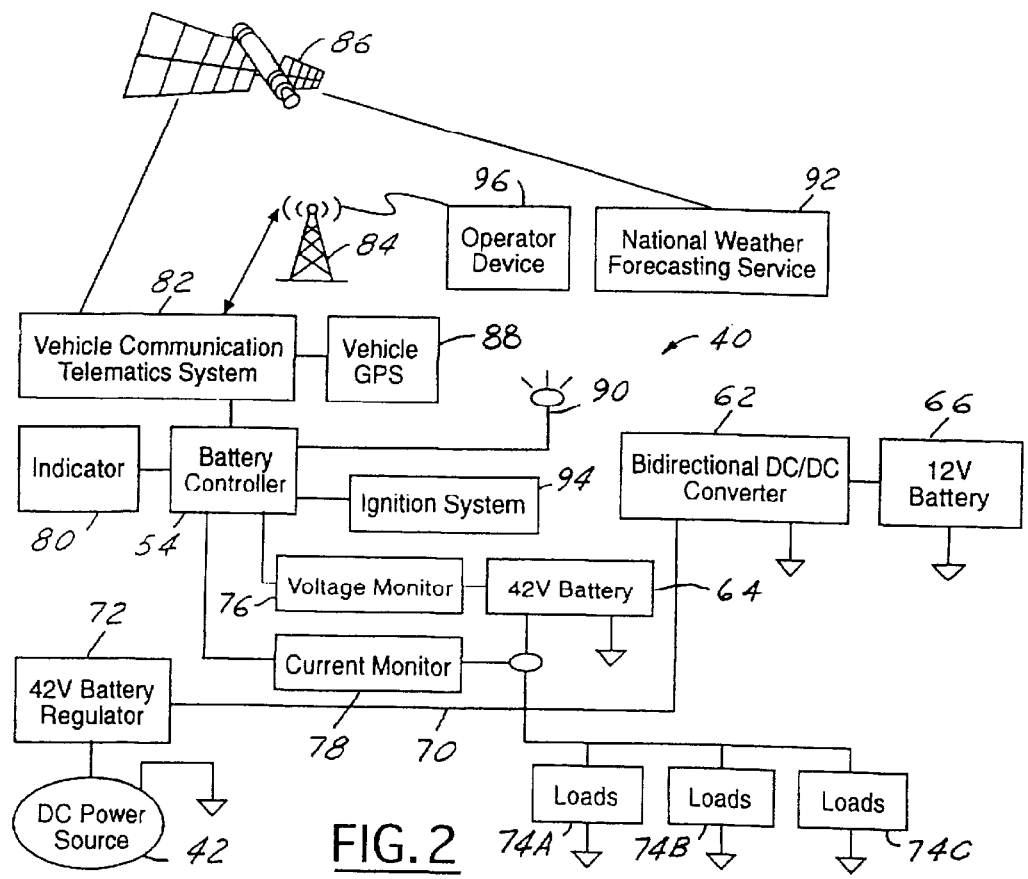
FIG. 2 is a more detailed schematic view of the engine accessory assembly of FIG. 1.

Referring now to FIG. 2, a more detailed block diagrammatic view of the system 40 is illustrated in further detail. Both a 42 volt battery 64 and a 12 volt battery 66 from FIG. 1 are included. Also, the DC power source may be the starter/alternator 42 illustrated in FIG. 1. The starter/alternator 42 is coupled to the 42 volt bus 70 through a regulator 72. Of course, other loads 74A, 74B, and 74C are also coupled to bus 70.

Battery controller 54 is coupled to 42 volt battery 64 through a voltage monitor 76 and a current monitor 78. By monitoring the battery voltage and current through voltage monitor 76 and current monitor 78, the state of charge of the 42 volt battery 64 may be determined.

Battery controller 54 is also coupled to an indicator 80. Indicator 80 may comprise an audible indicator, a visual indicator, or a combination of the two. Indicator 80 may also be located remotely from the vehicle and may comprise a cell phone, page or e-mail device. For these devices a vehicle communications telematic system 82 is coupled to battery controller 54. Vehicle communication telematic system 82 may couple information to a cell tower 84 or a satellite 86. The telematic system 82 may also be coupled to the vehicle global positioning system 88.

Battery controller 54 may also be coupled to a temperature sensor 90 for determining the outside temperature at the exterior of the vehicle. By knowing the exterior temperature the state of charge may be predicted to insure the starting capacity of the vehicle. Also, vehicle communication telematic system 82 may also be used to obtain a prediction of the weather through a satellite 86 from a forecasting service such as the National Weather Forecasting Service 92. Such information may be automatically received based on the position indicated by global positioning system 88.

Battery controller 54 may also be coupled to ignition system 94, which counts the battery cycles of the system.

By monitoring the state of charge of battery 64 and state of health prediction, the battery controller 54 may indicate to the vehicle operator long before problems arise that the battery may in the near future not be capable of starting the vehicle. As will be further described below, evasive measures may be performed such as disabling one or all of the loads 74A–74C from the bus 70.

Figure 3:
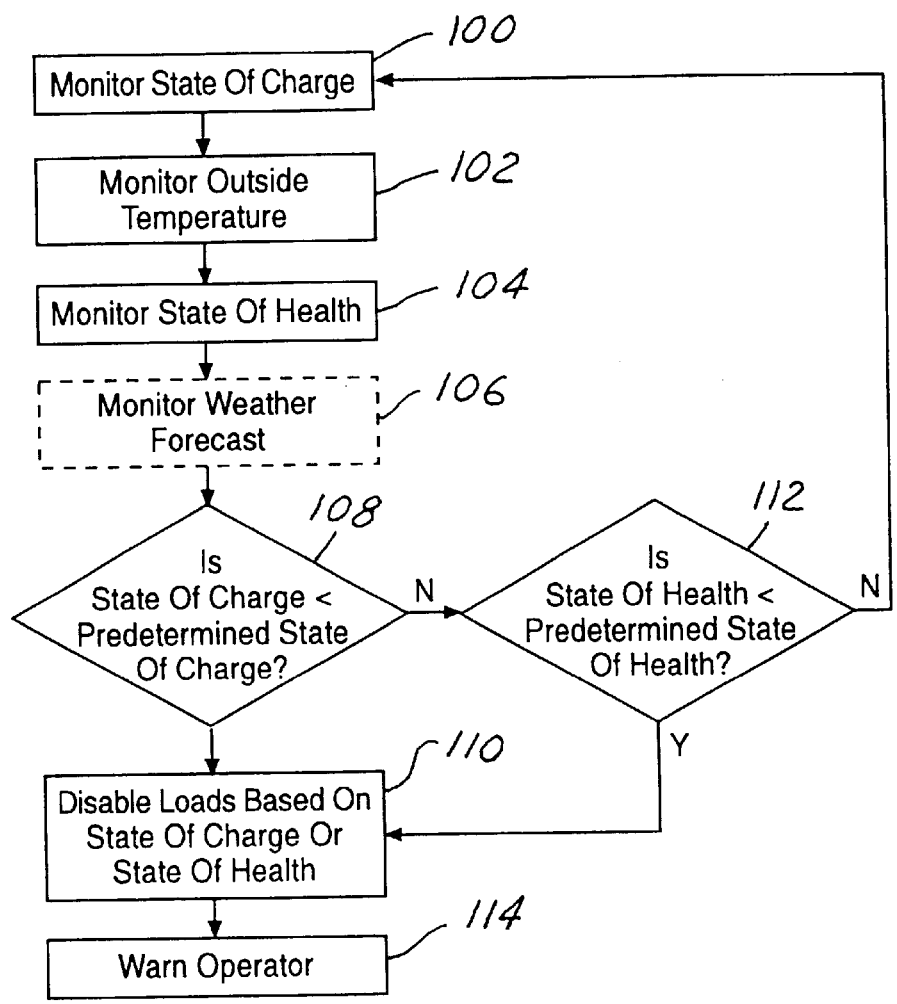
FIG. 3 is a flowchart illustrating the operation of the present invention.

Referring now to FIG. 3, the state of charge is monitored in step 100. The state of charge may be monitored by monitoring the current and voltage of battery 64 using voltage monitor 76 and current monitor 78. Outside temperature is monitored by temperature sensor 90 in step 102. In step 104, the state of health of the battery is also monitored. The state of health of the battery may be provided by monitoring the number of cycles through ignition system 94, the discharge of battery 64 during each of the cycles, and the state of charge voltage measured in step 100. In step 106, the weather forecast is monitored using vehicle telematic system 82, satellite 86, and the forecasting service 92. In step 108, the measured state of charge from step 100 is compared to a predetermined state of charge. If the measured state of charge is less than the predetermined state of charge, step 110 is executed in which loads may be disabled based upon a state of charge or the state of health. In step 108, if the state of charge is not less than the predetermined state of charge, step 112 is executed. In step 112, if the state of health is not less than the predetermined state of health, step 100 is again executed. In step 112, if the state of health is less than a predetermined state of health, step 110 is executed. Based on the measured state of charge and the measured state of health, loads may be disabled accordingly to provide an evasive action to maintain the power in the battery at a predetermined level so that the battery may provide enough power to the starter/alternator so that the starter/alternator may start the engine. In step 114, the operator of the vehicle is warned of the low state of health or the low state of charge or both. The vehicle operator may be warned visually or audibly through indicator 80 or if the vehicle is sifting in the vehicle operator's remote, a page through satellite 86 or through a cell tower 84 may be provided to operator device 96.

The predetermined state of charge in step 108 and the predetermined state of health 112 may be adjusted based upon the outside temperature monitored and a forecasted temperature as determined in step 106. By providing an indicator to the operator in step 114, evasive measures such as replacement of the battery or battery components or proper servicing may be performed to allow the vehicle to start.

While particular embodiments of the invention have been shown and described, numerous variations and alternate embodiments will occur to those skilled in the art. Accordingly, it is intended that the invention be limited only in terms of the appended claims.

What is claimed is:

1. A method of indicating for a battery of an automotive vehicle comprising:
    monitoring a state of charge of the battery;
    monitoring a temperature outside of the vehicle;
    comparing the state of charge to a predetermined state of charge, said predetermined state of charge being a function of said temperature; and
    generating an indicator when the state of charge reaches the predetermined state of charge.

2. A method as recited in claim 1 wherein when monitoring a state of charge comprises measuring a battery voltage and measuring a battery current.

3. A method as recited in claim 1 further comprising performing an evasive action to modify a change in the state of charge.

4. A method as recited in claim 3 wherein performing an evasive action comprises decoupling a load.

5. A method as recited in claim 1 wherein said predetermined state of charge corresponds to a starting state of charge to enable starting of the engine with a starter/generator.

6. A method as recited in claim 1 wherein generating an indicator comprises generating a visual indicator.

7. A method as recited in claim 1 wherein generating an indicator comprises generating an audible indicator.

8. A method as recited in claim 1 wherein generating an indicator comprises generating a page through a cellular phone system.

9. A method as recited in claim 1 further comprising monitoring a weather forecast, wherein said predetermined state of charge being a function of said weather forecast.

10. A method as recited in claim 9 wherein monitoring a weather forecast comprises monitoring a weather forecast using a vehicle telematic system and a global positioning system.

11. A method as recited in claim 1 further comprising monitoring a battery state of health; comparing the battery state of health to a predetermined state of health; and generating an indicator when the battery state of health reaches the predetermined state of health.

12. A method of indicating for a battery of an automotive vehicle comprising:

monitoring a state of charge of the battery;

monitoring a battery state of health;

monitoring a temperature outside of the vehicle;

comparing the state of charge to a predetermined state of charge, said predetermined state of charge being a function of said temperature;

comparing the battery state of health to a predetermined state of health; and generating an indicator when the battery state of health reaches the predetermined state of health or when the state of charge reached the predetermined state of charge.

13. A method as recited in claim 12 further comprising performing an evasive action to modify a change in the state of charge.

14. A method as recited in claim 12 wherein said predetermined state of charge corresponds to a starting state of charge to enable starting of the engine.

15. A method as recited in claim 12 wherein generating an indicator comprises generating a page through a cellular phone system.

16. A method as recited in claim 12 further comprising monitoring a weather forecast, wherein said predetermined state of charge being a function of said weather forecast.

17. A method as recited in claim 16 wherein monitoring a weather forecast comprises monitoring a weather forecast using a vehicle telematics system and a global positioning system.

18. A system for an automotive vehicle comprising:

a temperature sensor generating a temperature signal indicative of the temperature outside the vehicle;

a battery; and a battery controller coupled to the temperature sensor and the battery, said controller monitoring a state of charge of the battery, comparing the state of charge to a predetermined state of charge, said predetermined state of charge being a function of said temperature signal, said controller generating an indicator when the state of charge reaches the predetermined state of charge.

19. A system as recited in claim 18 further comprising a telematics system obtaining a weather forecast, said predetermined state of charge being a function of the weather forecast.

20. A system as recited in claim 18 further comprising a voltage sensor coupled to the battery for generating a voltage signal indicative of the battery voltage and a current sensor coupled to the battery for generating a current voltage signal indicative of the battery current.

21. A system as recited in claim 18 further comprising a starter/generator and a starting load, wherein said predetermined state of charge being a function of said temperature and said starting load.

* * * * *